(12) United States Patent
Oliveira et al.

(10) Patent No.: US 6,849,288 B2
(45) Date of Patent: Feb. 1, 2005

(54) SOYBEAN MEAL WITH A REDUCED FAT AND SOLUBLE SUGAR CONTENT, AND METHODS OF MAKING AND USING THE SAME

(75) Inventors: Miguel Angelo F. Oliveira, Porto Alegre (BR); Aurelio Cereto, Porto Alegre (BR); Rene Rech, Porto Alegre (BR); Cassio Morelli, Sao Paulo (BR)

(73) Assignee: Solae L.L.C., St. Louis, MO (US)

( * ) Notice: Subject to any disclaimer, the term of this patent is extended or adjusted under 35 U.S.C. 154(b) by 389 days.

(21) Appl. No.: 09/979,361
(22) PCT Filed: Aug. 22, 2001
(86) PCT No.: PCT/IB01/01999
§ 371 (c)(1), (2), (4) Date: Apr. 4, 2002
(87) PCT Pub. No.: WO03/017782
PCT Pub. Date: Mar. 6, 2003

(65) Prior Publication Data
US 2003/0157239 A1 Aug. 21, 2003

(51) Int. Cl.$^7$ ................................................ A23L 1/20
(52) U.S. Cl. ........................................ 426/634; 426/805
(58) Field of Search ................................ 426/634, 630, 426/805

(56) References Cited

U.S. PATENT DOCUMENTS

| | | | |
|---|---|---|---|
| 3,598,610 A | 8/1971 | Hawley et al. | 99/98 |
| 3,721,569 A | 3/1973 | Steinkraus | 99/98 |
| 3,925,569 A | 12/1975 | Daftary | 426/634 |
| 4,035,194 A | 7/1977 | Grassl | 106/154 |
| 4,359,480 A | 11/1982 | Kock | 426/430 |
| 4,496,599 A | 1/1985 | Steinkraus | 426/430 |
| 4,530,788 A | 7/1985 | Chang | 260/123.5 |
| 4,728,522 A | 3/1988 | Wear et al. | 426/242 |
| 4,748,038 A | 5/1988 | Lewis et al. | 426/456 |
| 4,785,726 A | 11/1988 | Wear et al. | 99/451 |
| 4,810,513 A | 3/1989 | Van Liere | 426/465 |
| 4,992,294 A | 2/1991 | Noguchi | 426/634 |
| 5,225,230 A | 7/1993 | Seaman et al. | 426/634 |
| 5,773,051 A | 6/1998 | Kim | 426/1 |
| 5,866,192 A | 2/1999 | Uesugi et al. | 426/634 |

FOREIGN PATENT DOCUMENTS

| | | |
|---|---|---|
| EP | 0 925 723 A1 | 6/1999 |
| GB | 1583991 | 2/1981 |

OTHER PUBLICATIONS

Snyder, Harry E., et al., *Processing of Soybeans*, Soybean Utilization, 1987, pp. 74–86, 130–133.

Cremer, Michael C., *Use and Future Prospects for Use of Soy Products in Aquaculture*, Opportunities for Soy Products in Animal Nutrition, Proceedings Soy in Animal Nutrition Symposium, Global Soy Forum '99, Chicago, IL, Aug. 6–7, 1999.

Primary Examiner—Anthony Weier
(74) Attorney, Agent, or Firm—Whyte Hirschboeck Dudek SC

(57) ABSTRACT

High protein, low soluble-sugar, oil containing soybean meal suitable for use as a partial or full replacement of fish meal and other protein and energy sources in the manufacture of fish and land animal feeds and petfoods, is produced by a process in which oil is mechanically extracted from dehulled, flaked soybeans. Soluble sugars are then extracted from the defatted soybean cake using an ethanol/water mixture in a counter-current solvent extraction process. The resulting meal contains a minimum of about 8 percent by weight residual soybean oil, and it is dried, cooled and ground to produce a fine, free-flowing powder product. The process also produces a sugar syrup suitable for use as a fermentation source for the production of ethanol, and a premium soybean oil. This syrup is also suitable to be used as a taste enhancer for animal feed (typically added to the soybean meal).

6 Claims, 6 Drawing Sheets

SOYBEAN MEAL WITH A REDUCED FAT AND SOLUBLE SUGAR CONTENT, AND METHODS OF MAKING AND USING THE SAME

This invention relates to soybean meal. In one aspect, the invention relates to a soybean meal with both a reduced fat and soluble sugar content while in another aspect, the invention relates to a method of making the soybean meal. In yet another aspect, the invention relates to an integrated process of making the soybean meal in combination with one or more economically useful by-products. In still another aspect, the invention relates to using the soybean meal as at least a partial substitute for fishmeal and other protein and energy sources in the preparation of manufactured animal feeds, particularly manufactured fish feed.

Soybeans are a major agriculture commodity in many parts of the world, and they are the source of many useful products for both human and animal consumption. Two of the more important products obtained from soybeans are soybean oil and soybean meal. While both of these products are consumed by humans and livestock, the primary use of soybean oil is as a vegetable oil for human consumption, and the primary use of soybean meal is as a component for animal feed mixtures. Soybean meal is high in protein, and it has proven to be an ideal source of amino acids used by animals in building their own proteins.

Many methods are known for the processing of raw soybeans into oil and meal. Illustrative of these processes are those taught in U.S. Pat. Nos. 3,721,569; 4,035,194; 4,359,480; 4,496,599; 4,728,522; 4,748,038; 4,785,726; 4,810,513; 4,992,294; 5,225,230; 5,773,051 and 5,866,192. Typical of these processes is the receipt of the soybeans from the field by any conventional transport means, for example, truck, barge, rail car, etc., in a dirty and often wet condition. The soybeans are then subjected to an elementary separation procedure, for example, contacted with a vibrating screen, in which the soybeans are separated from non-soybean material, for example, rocks, sticks, leaves, stems, dirt, weed seeds, etc., and unwanted soybean material, for example, scalpings, small or broken soybeans, loose hulls, etc.

The "clean" soybeans, in combination with the loose hulls that are not removed during the elementary separation procedure, are transferred to an aspirator in which most of the remaining loose hulls are removed by air. The soybeans are transferred to storage, and the loose hulls are collected as a by-product for further processing.

At this point the soybeans typically contain about 12 percent by weight water, but the actual water content of the soybeans will vary based on a host of different factors. If the water content of the soybeans is in excess of about 12 percent by weight, then typically the soybeans are subjected to drying so that the water content is reduced to below about 12 percent by weight before the soybeans are place in storage. As long as the moisture content of the soybeans remains below about 12 percent by weight, the soybeans can be stored for years without material degradation by bacteria or mold.

The manner in which the soybeans are processed from this point forward depends in large part upon the end products desired. Often the soybeans are first dehulled using such conventional equipment as cracking rolls or hammer mills in combination with a conventional aspiration system, but in some processes, such as that taught in U.S. Pat. No. 5,225,230, the hulls are not removed prior to further processing. Whether or not dehulled, the soybeans are almost always ultimately crushed or ground into a meal using conventional equipment, for example, grooved rollers. Prior to or during the crushing or grinding process, the soybeans are typically subjected to heat to deactivate antinutritional factors, for example, trypsin inhibitor and lectins.

The next process step is largely dependent upon the desired oil content of the soybean meal. If a "full fat" soybean meal is desired, then the meal is not subjected to oil (also known as fat or lipid) extraction. If, on the other hand, a "defatted" soybean meal is desired, then the meal is subjected to a fat extraction procedure, e.g., solvent or mechanical extraction. Most soybean meal available on the world market today is solvent-extracted soybean meal with an oil content of less than 1 percent by weight. In this process, the soybean meal is contacted with a suitable solvent, e.g., hexane, to remove the oil to a content of typically less than 0.5 percent by weight. U.S. Pat. No. 3,721,569 describes a conventional procedure. Alternatively, the soybean meal is defatted mechanically using, for example, a screw press. This "expeller" soybean meal typically contains between 4 and 8 percent by weight residual oil. If the intended use of the meal is as a feed supplement for ruminants, then the meal may first be heated and dried in a specified manner, such as taught in U.S. Pat. No. 5,225,230, before oil is extracted mechanically.

After the oil has been extracted from the meal, it is typically subjected to centrifugation or otherwise processed to remove contaminants. This produces a clarified, crude-grade oil. The soybean meal from which the oil has been extracted is dried and typically ground or pelletized and then milled into a state suitable for use as a food supplement or as an animal feed.

Depending on its ultimate end use, the meal at this stage maybe subjected to further processing. For example, if intended for human consumption, it maybe subjected to further fat extraction to remove residual phospholipids (as taught in U.S. Pat. No. 3,721,569).

The known processes for producing soybean meal in its various forms almost always produce a soybean meal that retains much, if not most, of the original soluble sugar content of the raw soybean. While some of this soluble sugar content may be removed during various washing or extraction steps, typically the soluble sugar content of the finished soybean meal is a significant fraction, for example, greater than 90 weight percent, of the soluble sugar content of the raw soybean. While the presence of this soluble sugar is typically of little, if any, consequence to adult herbivores and omnivores, it can prove detrimental to carnivores and young animals in general. One example of this is the negative effect of non-metabolized soluble sugars on the growth and health of farm-raised fish, for example, salmon or trout. Furthermore, the low energy density of fully defatted soybean meal (due to a high content of non-metabolized soluble sugars and a low level of fat) limits its inclusion levels in diets for intensive aquaculture. (Cremer, M., 1999. *Soy in Aquaculture Diets*. In: Drackley, J. K. Ed. Opportunities for Soy Products in Animal Nutrition. Global Soy Forum 1999, Chicago, Ill., Aug. 6–7, 1999).

The principal diet of farm-raised fish is manufactured fish feed, and this feed is a blend of many components selected for their nutritional value. One primary component, of course, is protein, and one primary source of the protein for this component is fishmeal, that is, a nutritive mealy substance produced from fish or fish parts. For all practical purposes, fishmeal is essentially free of soluble sugars. However, as excellent a source of protein as fish meal is, it is expensive to use as a protein source in manufactured fish feed. The production of fishmeal is a multi-step process including catching the fish, processing it, and then testing the meal for nutrient value. Moreover, only limited species of fish are available as a source for fishmeal, and the populations of these species is relatively constant. With demand for fishmeal increasing and government constraints protecting against over-fishing, availability of fishmeal is decreasing and its price is increasing. This rising expense is a driving force behind the constant search for alternative protein sources and due to its high protein content, soybean meal has the potential to be a full or partial replacement for fishmeal in manufactured fish feed.

Most commercially available solvent-extracted soybean meal, however, has either too little oil content (an excellent source of energy) and/or too much soluble sugars (mostly oligosaccharides). These sugars not only have little, if any, nutritional value to the fish, but if present in sufficient concentration, actually interfere with the fish's metabolism to the point that the health and growth of the fish can be adversely impacted. Moreover, since the sugars inherently present in soybeans are water-soluble and since the fish feed is presented to the fish in their natural environment, i.e., water, some of these sugars will naturally dissolve into the water before consumed by the fish and thus contribute pollution to the water. The presence of soluble sugars in the soybean meal also can have adverse effects if the soybean meal is used as a component in feeds for other animals, e.g., shrimp, piglets, calves and the like.

Accordingly, a continuing interest exists in a soybean meal that contains a reduced but significant amount of oil and little, if any, soluble sugars. In addition, a continuing interest exists in producing such a meal in an economically efficient manner, and that has utility in a number of different feed applications.

According to this invention, a high protein, low soluble-sugar, oil-containing soybean meal is produced by a process in which the soybeans are subjected to cracking, dehulling, conditioning and flaking before defatting and sugar extraction. As in traditional processes, raw soybeans are received from the field, cleaned and then either sent to storage or forwarded for further processing. Subsequent processing includes drying, cracking and dehulling the soybeans, and then the dehulled soybeans are heated and flaked. The flakes, typically comprising less than 1 percent by weight (wt percent) residual hulls, are heated prior to mechanical oil removal. The increase temperature enhances the oil removal, and the oil content of the resulting "cake" is reduced to between about 6 and about 12 wt percent based upon the weight of the cake. After decantation and degumming, the extracted oil is marketable as crude, degummed soybean oil.

The cake is further processed for removal of soluble sugars (also known as oligosaccharides or carbohydrates). First, the cake is soaked with full miscella in an alcohol/water solution comprising from about 50 to about 80 volume percent (v percent) alcohol until the cake is swollen. The cake has a very high absorption capacity and as such, it swells easily. The swollen cake is then conveyed gently to prevent collapse of the swollen cake through a counter-current extractor in which its is contacted with increasingly pure solvent, for example, ethanol/water solution.

The extraction of the cake produces two product streams. One stream is a full miscella stream which is an alcohol/sugar/water mixture (it may also contain a minor amount of soybean oil and protein). This stream is subjected to evaporation and/or distillation, which recovers most of the alcohol and produces a sugar solution (that is, a syrup) which has characteristics similar to the syrup produced by sugarcane processing plants. This syrup can be fermented to produce an alcohol that can be used in the extraction process.

The other stream is the cake which is still wet with the alcoholic solution. This stream is sent to a mechanical dewetting device, for example, an adjustable counter-pressure press, and then to a unit to remove residual alcohol to a content of less than about 1500 parts per million (ppm) based upon the weight of the final cake (that is, the dewetted, desolventized cake). The final cake is then dried, cooled and ground to the desired particle size.

Figure 1:
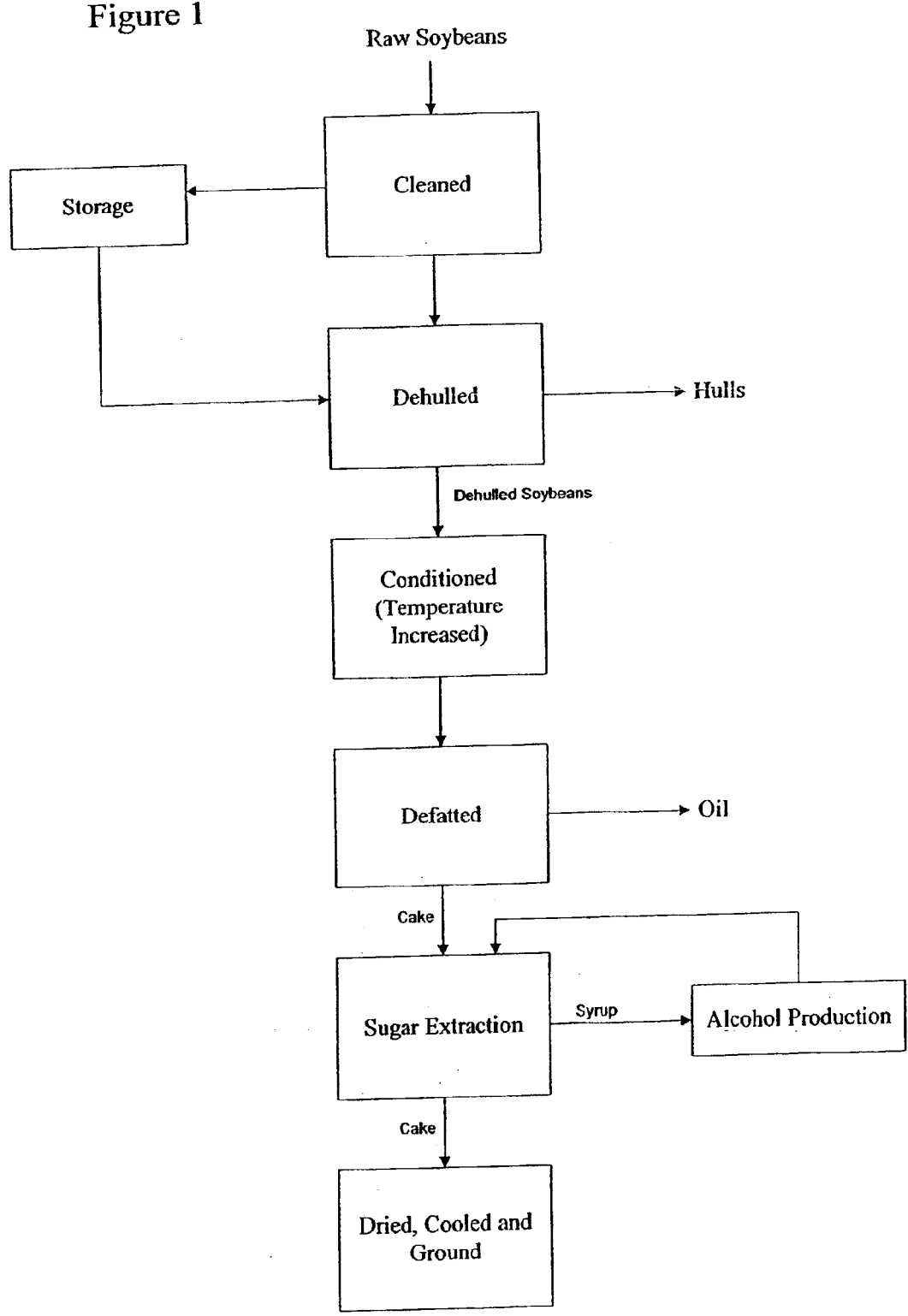
FIG. 1 is a schematic flow diagram of one embodiment of the process of this invention.

Referring to FIG. 1 and as noted earlier, the soybeans processed by this invention come from either the field or storage, or both. If from the field, the raw soybeans are cleaned and sorted to separate the beans from foreign matter and soybeans of unwanted quality, and then dried. If from storage, then presumably the raw soybeans have already underwent cleaning, sorting and drying. Typical of the raw soybeans used in this invention are U.S. Yellow #2 and #4 soybeans.

Whatever the source and quality of the raw soybeans, these beans are dehulled using any conventional technology. For example, the raw soybeans are exposed to circulating hot air (for example, about 100 C) for approximately 2–5 minutes to remove any residual moisture from the soybeans and to cause their cotyledons to shrivel. Raw soybeans typically have a moisture content of 12 wt percent or more, and this is typically reduced to 10 wt percent or less prior to dehulling. In turn, this facilitates the removal of the hulls. Any conventional equipment and procedures can be used to dehull the dried soybeans, for example, a roller mill with grooved rolls. The beans are typically broken into about eight pieces. The hulls and soybeans are subsequently passed through an aspirator in which the hulls are removed and the beans forwarded for conditioning prior to oil extraction. The hulls are recovered as a by-product of the process and can be subsequently processed (for example, ground or pelletized) into an animal feed supplement. After the dehulling operation, preferably the loose hull content of the dehulled soybeans is less than about 1 wt percent, and the amount of soybeans retaining their hulls is also less than about 1 wt percent.

The dehulled soybeans are then conditioned for oil extraction by mechanical means. Typically, the dehulled beans are conditioned in a vertical stacked-tray conditioner in which steam is usually the heating media (located beneath the bottom of the trays). Traditional conditioners are cylindrical in shape, and contain between 6–8 trays. This equipment will heat the soybean pieces ("meats") from an initial temperature of ambient (for example, about 25 C) to a final temperature of about 60 C over a period of about 20 minutes. At this temperature, the pieces exhibit at least a limited amount of plasticity.

Once heated, the meats are flaked by any conventional equipment, typically a roller press with smooth rolls operated at a pressure of about 60 kilograms per square centimeter ($kg/cm^2$). The typical thickness of the flakes is between about 0.40 to about 0.50 millimeters (mm).

The flakes are then heated in conventional equipment from a temperature of about 60 C (the temperature of the flakes from the flaking mill) to a temperature from about 90 to about 100 C. This heating is typically performed in a vertical stacked-tray conditioner (similar to that used for conditioning step described above) over a period of about 30 minutes.

The heated flakes are then passed to an oil-extraction apparatus, for example, screw press (also known as an expeller), in which the flakes are defatted. Mechanical extraction of oil from the flakes is one characterizing feature of this invention. Hexane or other solvent extraction of the fat component of the flakes is not used. The oil content of the flakes is reduced from greater than about 12 wt percent, typically between about 15–20 wt percent, to less than about 12 wt percent, preferably between about 6–10 wt percent. The amount of oil extracted from the heated flakes is controlled, at least in part, by controlling the amount of pressure applied to the flakes. The more pressure applied to the flakes, the more oil is extracted from the flakes. The maximum pressing pressure is typically does not exceed about 120 tons per square centimeters ($t/cm^2$).

The extracted oil is recovered and further processed in any conventional manner to render it suitable for sale as crude soybean oil. Further processing typically includes degumming and clarification, the latter a procedure, in which solids are removed typically by centrifugation. Because the oil is prepared without the use of solvents, it typically commands a price premium.

The defatted flakes, that is, flakes now containing between about 6–12 wt percent oil, are expelled from the screw press as a cream-colored cake. Typically, this cake is deposited onto a conveyer belt and transferred to a counter-current solvent extraction apparatus for removal of soluble sugars. The cake is allowed to cool to about 75 C, and then it is transferred carefully to the solvent extractor to avoid collapse of the cake. If the cake is allowed to collapse, the very fine particle components of the cake, that is, the "flour", will disengage from the cake and entrain into the solvent from which it can eventually precipitate onto equipment filters and surfaces (which in turn can result in equipment plugging).

The cake is transferred to the counter-current extractor (vertical or horizontal configuration) in which it is placed into baskets, or onto a belt, or other means within the extractor for transporting it from the inlet of the extractor to the outlet of the extractor. Both the transfer of the cake into the baskets or onto the belt, and the movement of the basket or belt inside the extractor is slow and careful so as to avoid collapse of the cake.

The first stage of the extraction process is the swelling stage, and this can occur either inside or outside of the extractor. Typically, this swelling stage is performed is a screw conveyor designed to provide maximum contact between the full miscella and the cake, and this contact typically results in the cake at least doubling in size (volume). This increase in cake volume reduces or eliminates plugging problems that may result once the cake is transferred to the extractor (or if already within the extractor, once it moves from the swelling stage to the next stage in the extraction process).

Once inside the extractor, the cake is again contacted with full miscella, (that is, a mixture comprising alcohol/water/soluble sugars). As the cake moves to the outlet or discharge end of the extractor, it is continuously contacted with increasingly clean solvent, that is, solvent free of extracted material from the cake, and this clean solvent will extract the soluble sugars from the cake. By the time the cake has progressed to the outlet of the extractor, the solvent has changed from full miscella to essentially pure solvent, (that is, a water/alcohol mixture that is about 60 percent volume alcohol). Any alcohol or mixture of alcohols that will extract the soluble sugars from the defatted cake can be used in the practice of this invention although for reasons of efficiency, economy and product safety, ethanol is the preferred alcohol. The solvent extraction process will remove the soluble sugars to less than about 1.5 wt percent of the defatted cake. The process may also remove a small but negligible amount of oil from the defatted cake, and this oil will become part of the miscella.

The extraction process generates two product streams. The first, of course, is the defatted, desugared cake. This cake is transferred to a standard desolventizer system (for example, Schneken screws followed by a DT—Desolventizer Toaster) or a flash evaporator to remove alcohol to a content of less than 1500 ppm. A flash evaporator is typically used if the meal is intended for human consumption. The cream-colored cake is ground and then packaged and/or stored for sale. If stored properly, it will hold its nutritional value for six or more months. Packaging can vary to demand ranging from relatively small bags of 25 kg or less, to bulk bags of 800 kg or more, to bulk containers.

The other stream is a by-product stream of full miscella which is recovered from the bottom of the extractor. This stream is typically sent to a conventional evaporator system, a system normally comprising a set of two vertical counter-current evaporators, that is operated with one or both of a defoaming device and antifoaming agent. An alcohol rich mixture ranging from 55–70 percent volume is recovered from the evaporator system and returned to the extraction process. The molasses (mixture of sugar, water and small amounts of alcohol) that is recovered from the evaporator system is then transferred to a distillation column or to a thin film evaporator (the choice dependent upon the desired product). If the desired product is a concentrated sugar syrup, e.g., a syrup containing 80 wt percent or more sugar, then the molasses is typically transferred to a thin-film evaporator for final removal of water and trace amounts of alcohol, and the product is used as a taste enhancer for animal feeds.

If the desired product is a syrup with a sugar concentration of less than 80 wt percent, then the molasses is typically transferred to a conventional alcohol distillation column. The bottom stream from the distillation column is typically about 60–65 wt percent of the feed stream to the column, and it typically contains between 1 and 3 wt percent alcohol. This bottom stream is preferably sent to a fermentation plant for conversion to ethanol. This sugar syrup tends to provide a better yield of ethanol than does traditional sugarcane syrup. The ethanol can be returned to the solvent extraction process, and it lower the overall expense, or input, or operational cost of the process. The broth that is recovered from the fermentation tanks is a useful fertilizer.

Before the defatted, desugared cake is sent to the flash evaporator, it is pressed to reduce the amount of solvent (water/alcohol). After the extractor and before pressing, the defatted, desugared cake typically contains about 75 wt percent solvent/water. After pressing, the cake typically contains about 50 wt percent solvent/water.

The final soybean meal product has a fine, free-flowing, dry, cream-colored powder appearance. It comprises protein, moisture, fat, crude fiber, carbohydrates and various amino acids, for example, lysine, methionine, cystine, threonine, leucine, isoleucine, phenylalanine, tyrosine, tryptophan, histidine and valine.

Because of its relatively high oil content and relatively low soluble-sugar content, the soybean meal produced by the process of this invention is particularly well adapted for use in manufactured fish feeds, particularly as a substitute for some or all of the fish meal component of the manufactured fish feed. The soybean meal of this invention also is useful as a protein and energy source in other manufactured animal feeds, particularly for carnivores and omnivores, for example, shrimp, piglets, calves and pet animals (for example, cats and dogs).

The invention is more fully described by the following examples. Unless indicated to the contrary, all parts and percentages are by weight.

EXAMPLE 1

Soybean Meal Production

Figure 2:
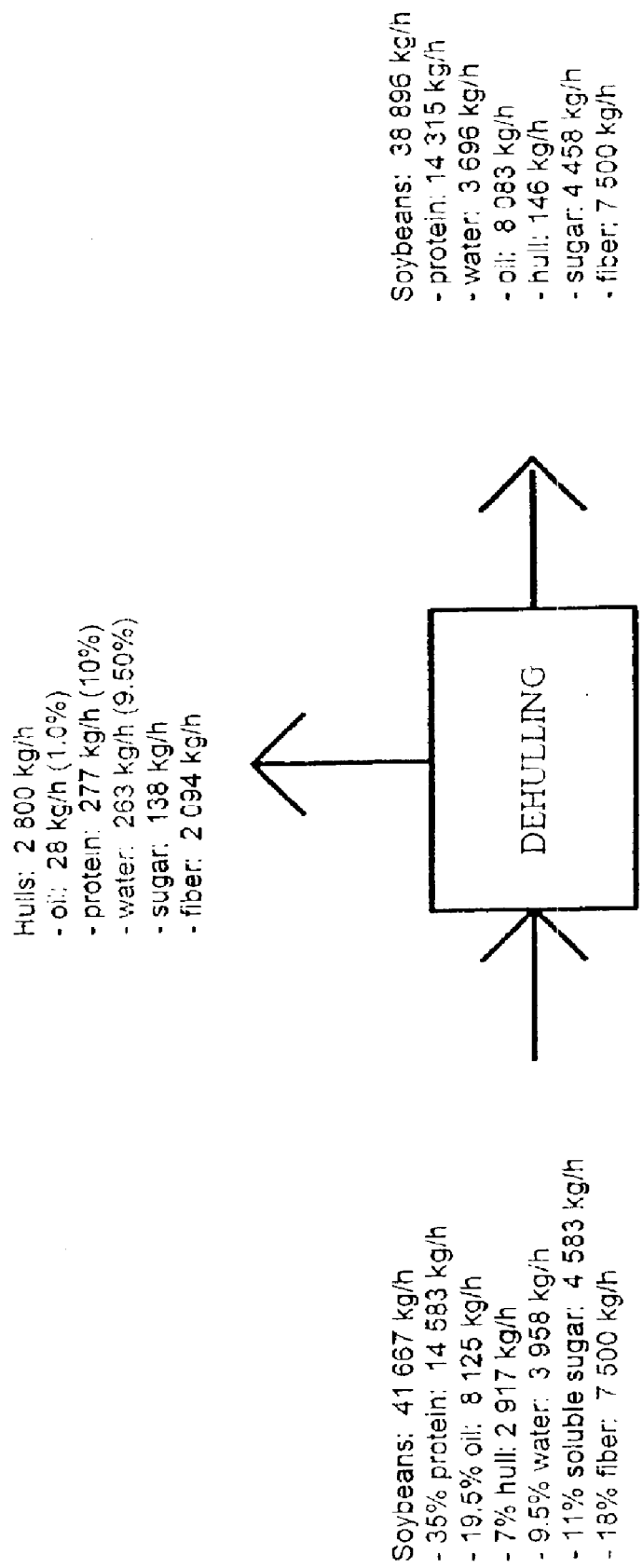
FIG. 2 is a schematic of a material balance for the dehulling operation of this invention.

U.S. Yellow No. 4 soybeans are used in this example. After sorting and cleaning, the beans are dried from an initial water content of about 12 wt percent to a final water content of about 9.5 wt percent. The beans are then heated to a temperature of about 60 C and fed to a roller mill equipped with grooved rolls in which the beans are dehulled and broken into pieces. The hulls and pieces are fed to an aspirator in which the hulls are separated from the bean pieces (the "meats"). After aspiration, the soybean meats contain less than 1 wt percent loose hulls and less than 1 wt percent of the meats retain hull fragments. FIG. 2 reports a typical material balance for the dehulling operation.

Figure 3:
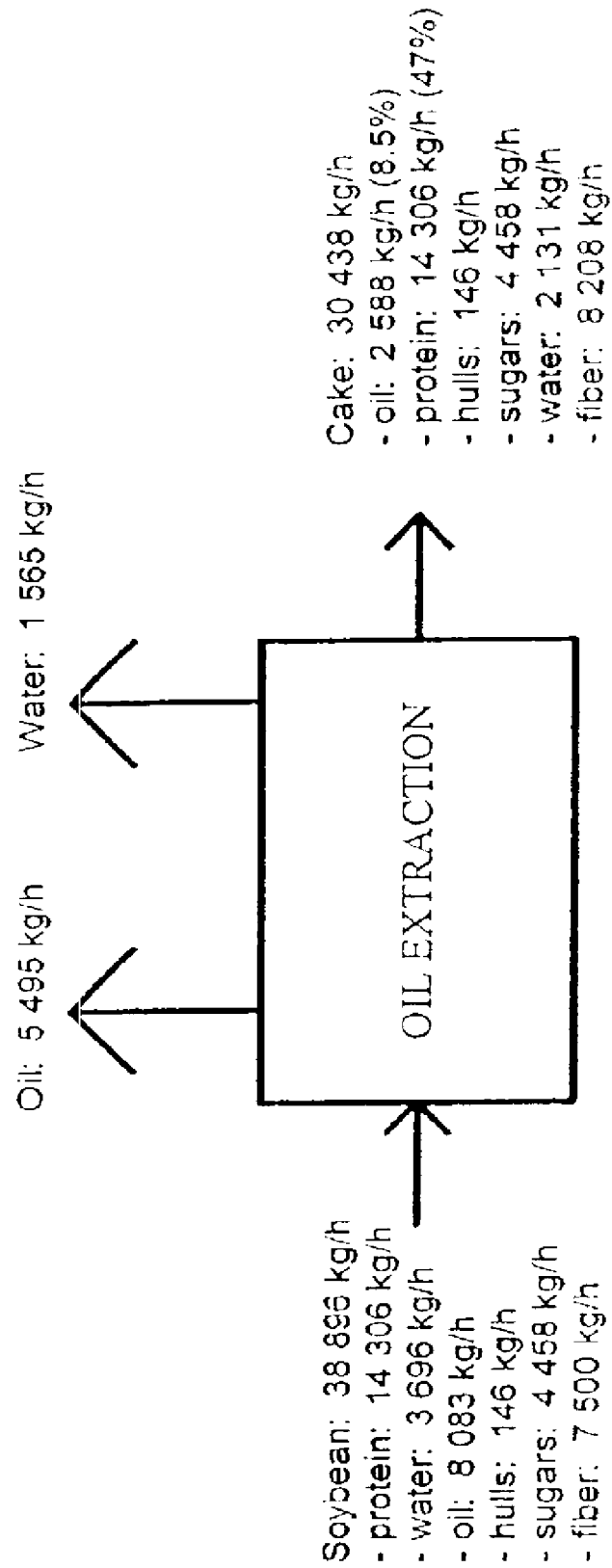
FIG. 3 is a schematic of a material balance for the oil extraction operation of this invention.

The soybean pieces are heated on trays within a conditioner to raise their temperature from 25 C to about 60 C over a period of about 20 minutes. The heated meats are then fed to a roller mill with smooth rolls to produce flakes with a thickness between about 0.40 and about 0.50 mm. The flakes are then heated in a vertical stacked-tray conditioner to raise their temperature from about 60 C to between about 90 and 100 C over a period of about 30 minutes. The heated flakes are then fed to a screw press in which soybean oil is mechanically extracted. The oil content is reduced from about 21 wt percent to about 8.5 wt percent. FIG. 3 reports a typical material balance of this defatting operation.

The recovered oil is for about 30 minutes, decanted from the solids, and then degummed at a temperature of about 70 C. This last operation involves the addition of a small amount of water (about 2 wt percent) which is subsequently removed under vacuum (60 mmHg). The resulting oil is clear and of a light color, and constitutes a premium crude-grade soybean oil.

The cake recovered from the screw press is collected on a conveyor belt and allowed to cool to about 75 C. The belt transfers the cake to a counter-current solvent extractor equipped with an Archimedes-screw which acts as a "sweller". Inside this screw the cake is allowed to soak in full miscella for about 30–40 minutes at a temperature of about 70 C in which the cake volume swells by about 150 percent. The cake is then gently transferred from the "swelling" screw to the inlet of the counter-current extractor.

Figure 4:
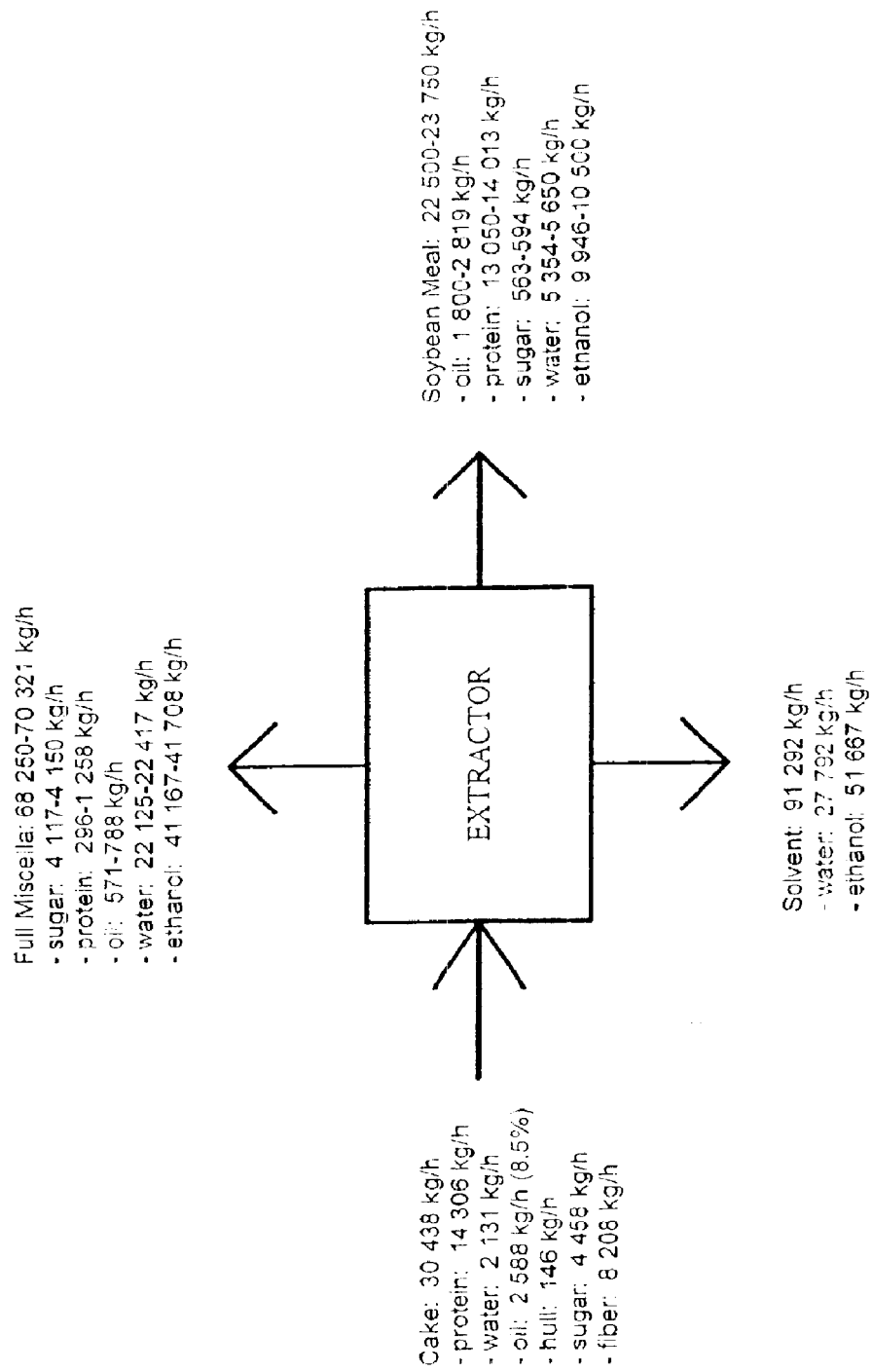
FIG. 4 is a schematic of a material balance for the soluble sugar extraction operation of this invention.

The extractor is operated in a manner that the total resident time of the cake within the extractor is about 1 hour. The cake is subjected to nine separate stages of extraction in which 2 to 2.5 kg of solvent is used for each kilogram of cake. The maximum height of the bed is about 1.2 m, and the solvent is allowed to percolate through the bed at a rate of about 10,000 liters per hour per square meter (1/hr/m$^2$). At the end of the extraction process, the cake is allowed to drain for about 12 minutes. FIG. 4 reports a typical material balance for this extractor operation.

Figure 5:
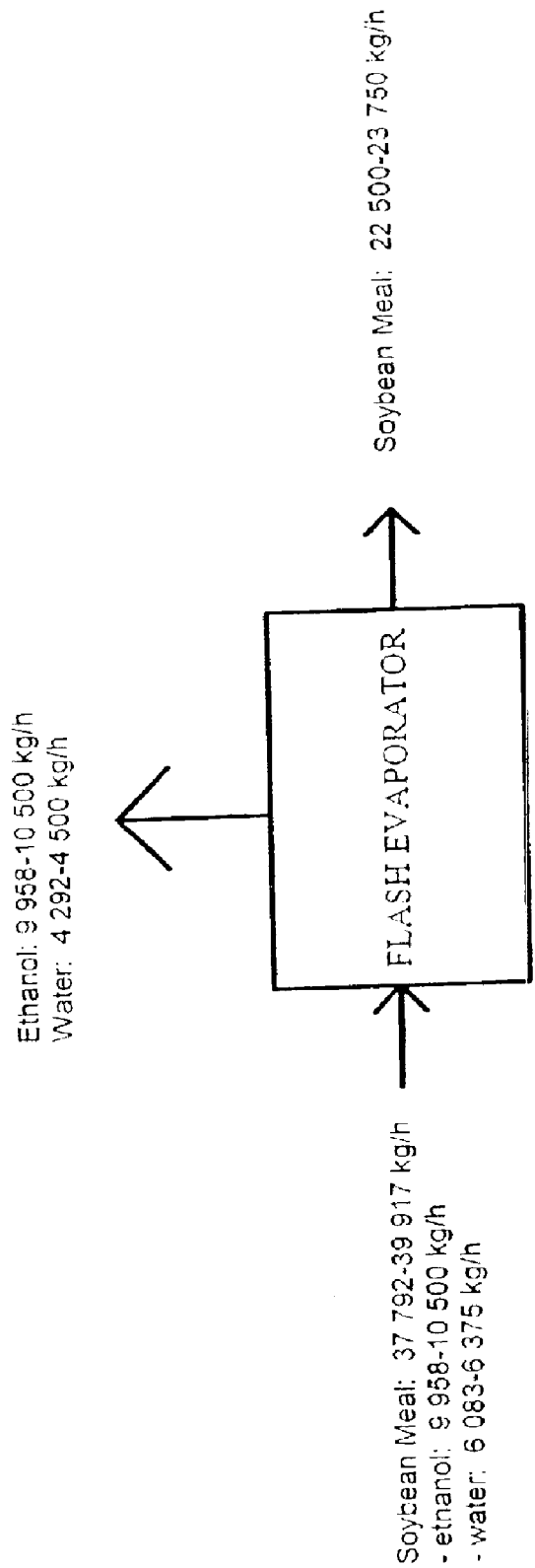
FIG. 5 is a schematic of a material balance for the flash evaporation operation of this invention.

The cake recovered from the extractor is pressed to recover solvent. The cake is compressed to about one-third of its original size, and the solvent content of the cake is reduced from about 75 wt percent to about 50 wt percent. The cake is then transferred to a conventional desolventizer or to a flash desolventizer in which the solvent, that is, water/ethanol, is removed to a level of less than about 1000 ppm ethanol. The desolventizer is operated at a maximum temperature of about 100 C. FIG. 5 reports a typical material balance for the desolventizer. Once recovered from the desolventizer, the soybean meal is dried, ground, packaged and/or stored.

The miscella recovered from the extractor is transferred to a conventional evaporator system in which it is mixed with an antifoaming agent and about 60 wt percent of the ethanol is recovered and recycled to the extractor. The remaining miscella is transferred to a distillation column. This remaining miscella is now a syrup at a temperature of about 70 C.

Figure 6:
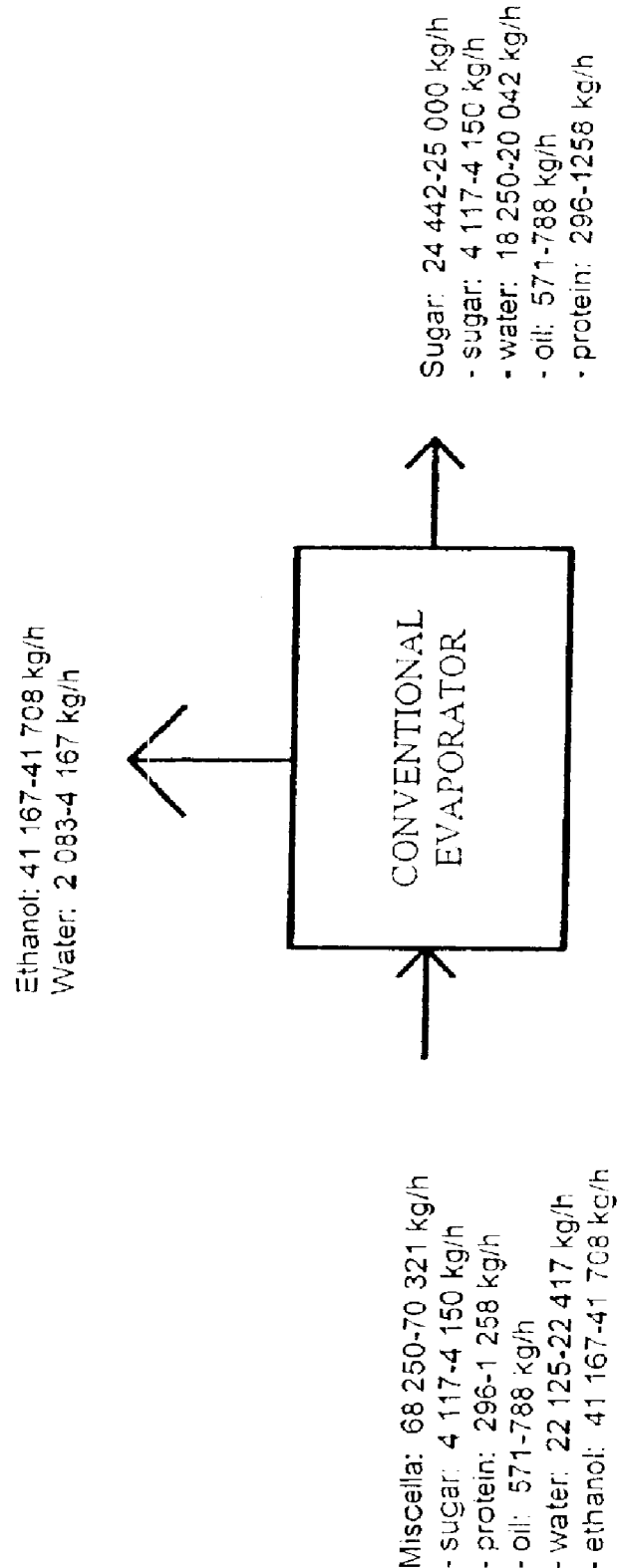
FIG. 6 is a schematic of a material balance for the conventional evaporation operation of this invention.

It has a solid concentration of about 11 wt percent upon entering the distillation column, and about 30–35 wt percent upon exiting the distillation column. The maximum temperature of the syrup within the column is about 85 C and after the syrup leaves the column, its temperature is reduced to about 40 C. The maximum ethanol concentration of the syrup is about 0.5 wt percent. The recovered sugar syrup (or molasses) comprises about 50 wt percent sucrose, about 25 wt percent stachyose and about 25 wt percent raffinose. The total sugar content of the molasses is about 16 wt percent. FIG. 6 reports a typical material balance for the operation of the conventional evaporator.

The sugar syrup can be fermented to produce ethanol. In appropriately sized vats, between about 100,000 and about 300,000 liters of sugar syrup is mixed with yeast at an ambient temperature and a pH between about 3.5 and about 4.0 for about 8 hours. Between about 1 and 2 kg per vat of antifoaming agent is added. The fermentation process produces about 0.562 kg of ethanol per kilogram of sugar.

Soybean meal produced by this process typically has the following characteristics:

| PHYSICO-CHEMICAL | |
|---|---|
| Appearance | Fine, free flowing dry powder |
| Protein (as N × 6.25) | min 58.0% |
| Moisture | max 8.0% |
| Fat | min 6.0% |
| Ash | max 5.5% |
| Crude Fiber | max 5.0% |
| Carbohydrates (NFE) | 17.0 to 21.0% |
| Oligosaccharides | max 3.0% |
| Trypsin inhibitor | max 5000 TIU/g of product |
| Lovibond Color | max standard L min 65.0 |
| | a max 4.0 |
| | b max 20.0 |
| | min standard L max 70.0 |
| | a min 2.0 |
| | b min 17.0 |

| MICROBIOLOGICAL | |
|---|---|
| Total Plate Counte | max 20,000 cfu/g |
| Salmonella | absence in 25 g |

| AMINOGRAM | | |
|---|---|---|
| Amino Acid | g/100 g of protein | g/100 g of product |
| Lysine | 6.2 | 3.8 |
| Methionine | 0.9 | 0.5 |
| Cystine | n.a*. | n.a*. |
| Threonine | 3.2 | 1.9 |
| Leucine | 8.7 | 5.3 |
| Isoleucine | 4.5 | 2.7 |
| Phenylalanine | 5.1 | 3.1 |
| Tyrosine | 3.5 | 2.1 |
| Tryptophan | 2.0 | 1.2 |
| Histidine | 2.5 | 1.5 |
| Valine | 4.9 | 3.0 |

*n.a. = not analyzed

EXAMPLE 2

Use of Soybean Meal as a Replacement for Fish Meal in Fish Feed

Materials and Methods

Nine extruded diets were fed to triplicate groups of 88-g Atlantic salmon in an 84 days experiment in 9 C freshwater. LT-fish meal was partially replaced by dehulled soybean meal (manufactured by Denofa, and providing 30 percent crude protein in the diet) or AkvaSoy (a soybean meal made by the process of this invention, and providing 40 percent crude protein in the diet), and the soya diets were supplemented with emulsifiers (0.5 percent phospholipids; 0.5 percent bile; 0.5 percent phospholipids+0.5 percent bile). The diet formulations and proximate compositions are shown in Tables 1 and 2.

TABLE 1

Diet formulations

| Ingredient (g/kg) | Diet | | | | | | | | |
|---|---|---|---|---|---|---|---|---|---|
| | 0 | 1 | 2 | 3 | 4 | 5 | 6 | 7 | 8 |
| LT Fish Meal | 609 | 440 | 440 | 440 | 440 | 360 | 360 | 360 | 360 |
| Denofa Dehulled SBM | 0 | 293 | 293 | 293 | 293 | 0 | 0 | 0 | 0 |
| Akvasoy SBM | 0 | 0 | 0 | 0 | 0 | 286 | 286 | 286 | 286 |
| Fish Oil | 160 | 179 | 179 | 179 | 179 | 166 | 166 | 166 | 166 |
| Wheat | 179.3 | 27.3 | 22.3 | 22.3 | 17.3 | 122.3 | 117.3 | 117.3 | 112.3 |
| Ca(H$_2$PO$_4$)$_2$ | 10 | 17 | 17 | 17 | 17 | 22 | 22 | 22 | 22 |
| DL-Methionine | 0 | 2 | 2 | 2 | 2 | 2 | 2 | 2 | 2 |
| Phospholipids | 0 | 0 | 5 | 0 | 5 | 0 | 5 | 0 | 5 |
| Bile salt | 0 | 0 | 0 | 5 | 5 | 0 | 0 | 5 | 5 |
| Constant ingredients[1] | 41.7 | 41.7 | 41.7 | 41.7 | 41.7 | 41.7 | 41.7 | 41.7 | 41.7 |

[1]Constant ingredients (g/kg diet): Vitamin and micromineral premix, 10.0; Modified potato starch, 30.0; Pigment (8 Astaxanthin), 0.3; Vitamin C (15 percent), 0.4; Y$_2$O$_3$, 1.0.

TABLE 2

Proximate composition of the diets

| Nutrient composition | Diet | | | | | | | | |
|---|---|---|---|---|---|---|---|---|---|
| | 0 | 1 | 2 | 3 | 4 | 5 | 6 | 7 | 8 |
| Dry matter, g | 969 | 942 | 932 | 933 | 931 | 971 | 970 | 961 | 959 |
| Protein, g | 474 | 456 | 455 | 459 | 456 | 460 | 458 | 457 | 457 |
| Fat, g | 222 | 216 | 211 | 221 | 218 | 227 | 240 | 236 | 240 |
| Starch, g | 126 | 60 | 60 | 56 | 54 | 104 | 110 | 111 | 108 |
| Ash, g | 92 | 90 | 86 | 88 | 87 | 81 | 81 | 80 | 82 |
| Astaxanthin, mg | 25.7 | 25.4 | 22.4 | 28.1 | 24.6 | 26.6 | 25.9 | 27.6 | 25.6 |
| Gross energy, MJ/kg | 22.5 | 21.9 | 21.8 | 21.9 | 21.7 | 22.9 | 22.8 | 22.6 | 22.8 |

Results and Discussion

The experimental results are summarized in Table 3.

TABLE 3

Summary of experiment results (0–84 days).

| Result | Diet | | | | | | | | |
|---|---|---|---|---|---|---|---|---|---|
| | 0 | 1 | 2 | 3 | 4 | 5 | 6 | 7 | 8 |
| Feed intake FI (g) | 85.5 | 101.1 | 101.7 | 100.2 | 103.0 | 88.7 | 89.7 | 88.4 | 93.2 |
| Weight gain WG (g) | 114.4 | 121.0 | 118.9 | 121.7 | 115.6 | 111.0 | 112.1 | 108.1 | 111.5 |
| Feed conversion (FI/WG) | 0.75 | 0.84 | 0.86 | 0.82 | 0.89 | 0.80 | 0.80 | 0.82 | 0.84 |
| Apparent energy Digestibility (%) | 90.8 | 91.0 | 91.1 | 92.9 | 92.7 | 91.2 | 90.5 | 90.0 | 90.8 |
| Apparent energy Digestibility (%) | 88.5 | 85.0 | 84.6 | 88.4 | 87.7 | 85.3 | 84.2 | 84.5 | 84.0 |
| Protein retention (%) | 53.9 | 49.8 | 50.0 | 50.8 | 47.2 | 53.9 | 51.2 | 50.4 | 48.9 |
| Pigment in flesh (mg/kg) | 0.9 | 1.0 | 0.8 | 1.1 | 1.2 | 1.3 | 1.0 | 1.4 | 1.3 |

All fish groups grew well. Specific growth rates were approx. 1 percent $d^{-1}$ and the feed:gain ratios (FGR) ranged between 0.7 and 0.9. There small differences in digestibility of protein, while the digestibility of energy was lower in the diets with soya. The salmon fed Denofa performed better than the ones fed Akvasoy. The feed intake and digestibility of protein and energy were highest for the fish fed Denofa. FGR was lower for the salmon fed Akvasoy. The pigmentation was better for the fish fed Akvasoy than the ones fed Denofa.

No differences in the growth were seen with respect to inclusion of phospholipids. FGR was improved slightly by the inclusion of phospolipids into the diets, while energy digestibility and protein retention were slightly reduced. Pigmentation was not affected by phospholipid supplementation.

For bile supplementation, there was a slight reduction in growth and FGR during the first month of feeding, while this was not consistent during the rest of the study. Bile supplementation resulted in increased digestibility of both protein and energy for the diets with extracted soy, but not for the ones with Akvasoy. Inclusion of bile in the diets gave a reduction in protein retention. Carcass percent was reduced and percent of intestines increased by bile supplementation, but the content of fat in the intestines was reduced. There was a tendency of increased pigmentation and an increased in variation flesh colour within groups of fish when supplementing the soy diets with bile.

EXAMPLE 3

Use of Soybean Meal as a Partial Replacement of Dried Skim Milk in Feeds for Earlier Weaned Pigs Materials and Methods A nursery trial involving 792 pigs weaned at 16 to 20 days was conducted to evaluate the effects of feeding Akvasoy (a soybean meal made by the process of this invention) or Soy Protein Concentrate (SPC) as partial replacement of dried skim milk blend on performance in a four phase nursery program. Dietary treatments were:

Phase 1

| | |
|---|---|
| Treatment 1- | Control 1 |
| Treatment 2- | Replacing 25% lysine from dried skim milk blend with lysine from Akvasoy. |
| Treatment 3- | Replacing 50% lysine from dried skim milk blend with lysine from Akvasoy. |
| Treatment 4- | Control 1 |
| Treatment 5- | Replacing 25% lysine from dried skim milk blend with lysine from Profine-E (SPC). |
| Treatment 6- | Replacing 50% lysine from dried skim milk blend with lysine from Profine-E (SPC). |

-continued

Phase 2

| Treatment 1- | Control 2 |
| Treatment 2- | Control 3 |
| Treatment 3- | Control 4 |

The trial design was a completed randomized block. Pigs were visually sorted by size into three replicates by weight within sex (22 barrows or 22 gilts/pen). Pen weights were determined within replicate. Pens were randomly assigned to one of the six experimental diets (3 pens of gilts and 3 pens of barrows/treatment). Upon consumption of phase one feed, pens were fed a common diet during phase 2, 3 and 4. Phase 2, 3 and 4 were analyzed by phase one treatment designation. Average initial weights by replicate are shown in Table 4.

Phase one diets were formulated to contain 1.60 percent total lysine with 450 pounds per ton (lb/ton) spray dried whey and 25.1 total lactose. The experimental diet for phase 2 was formulated to contain 300 lb/ton spray dried whey (10.2 percent total lactose) at a 1.45 percent total lysine, 3.0 percent fish meal and 1.25 percent blood meal. Phases 1 and 2 contained 2400 ppm added zinc (as zinc oxide). The phase 3 diet contained 1.35 percent total lysine with 2.5 percent fish meal and 4.25 percent total lactose. The phase 4 diet contained 1.23 percent total lysine with 1.25 percent blood meal.

The amount of each phase diet fed per pig was based on initial weight. Feed allotments by replicate and phase are listed below. Phase 4 feed was fed upon consumption of allocated phase 3 feed unit completion of the trial.

| Replicate | Phase 1 | Phase 2 | Phase 3 |
|---|---|---|---|
| 1 | 1.9 lb/pig | 5.5 lb/pig | 12.0 lb/pig |
| 2 | 2.7 lb/pig | 6.5 lb/pig | 14.0 lb/pig |
| 3 | 3.2 lb/pig | 7.5 lb/pig | 16.0 lb/pig |

Peg pig weights, feed consumption and feed:gain ratio were calculated at the end of each dietary phase. Dietary phases were switched only when 3 of the 6 pens in the replicate had consumed their allotted feed poundage. When needed, pigs were injected with a combination of vitamin $B_{12}$, dexamethasone, and penicillin as prescribed by the unit veterinarian.

Data were analyzed as a randomized complete block using the GLM procedure of SAS. The statistical model included treatment, sex, weight block and first order interactions. Interactions with probability of >0.25 were eliminated from the model and pooled in the error term. Initial weight was used as a covariant in all performance analyses. Main effect means were separated by Student's-T test.

Results and Discussion

Phase 1 (11.6 to 13.9 lb)

Replacing dried skim with increasing levels of Profine-E (on a lysine basis) resulted in a quadratic response on daily weight gain (P<0.05) and feed conversion rate (P<0.07). Average daily gain was increased by replacement at 25 percent Profine-E but decreased with 0 and 50 percent. Feed gain followed a similar pattern. There were no significant differences (P<0.10) in performance with increasing levels of Akvasoy.

Phase 2 (13.9 to 20.4 lb)

Replacing dried skim milk with increasing levels of Profine-E on a lysine basis in phase 1 resulted in a linear improvement (P<0.08) in feed:gain ratio in the phase 2 diet. Pigs converted feed more efficiently with increasing levels of Profine-E in the previous phase diet. Average daily gain and feed intake were not significantly affected (P<0.10) in performance with previous Akvasoy treatment.

Phase 3 (20.4 to 32.3 lb)

Replacing dried skim with increasing levels of Profine-E in phase 1 resulted in a linear response in daily weight gain (P<0.02) and feed intake (P<0.04) in phase 3). Increasing levels of Profine-E in phase 1 resulted in a linear response in gain (P<0.07) difference in performance. Level of Akvasoy in Phase 1 had no effect on phase 3 performance.

Phase 4 (32.3 to 53.5 lb)

Pigs prevously fed Akvasoy consumed 4.8 percent more feed (P<0.02) than those previously fed Profine-E during the 17 day phase 4 feeding period. Replacing dried skim milk with increasing levels of Profine-E in phase 1 resulted in a linear decrease (P<0.04) in average daily feed intake in phase 4. However, phase 1 replacement of dried skim milk with increasing levels of Akvasoy on a lysine basis resulted with a quadratic response (P<0.05) in feed consumption. Feed intake during phase 4 was increased by replacement at 25 percent Akvasoy in phase 4, but decreased with 0 and 50 percent.

Overall (11.6 to 53.5 lb)

Feeding dried skim mil, Akvasoy or Profine-E during phase 1 had no significant effect (P<0.10) on overall performance. However, pigs fed Akvasoy were 1.2 lb heavier at the end of the 46 day feeding period than those fed Profine-E (P<0.10). The interactive means show that replacing dried skim milk with increasing levels of Akvasoy in phase 1 resulted in a quadratic response in ADG (P<0.08) and ADFI (P<0.08) in gilts.

Although the invention has been described in considerable detail through the proceeding descriptions and examples, this detail is for the purpose of illustration and is not to be construed as a limitation on the scope and spirit of the invention as described in the appended claims.

What is claimed is:

1. A process for preparing a high protein, low soluble-sugar, oil-containing soybean meal from raw soybeans, the process comprising:

A. cleaning, sorting and drying the raw soybeans;
B. dehulling the cleaned, sorted and dried soybeans;
C. conditioning and flaking the dehulled soybeans;
D. mechanically reducing the oil content of the flaked soybeans to produce a soybean oil product and a defatted cake; and
E. extracting with ethanol soluble-sugars from the defatted cake to produce (i) a syrup product, and (ii) a cake product, the cake containing less than about 5 percent by weight soluble sugars; and F. fermenting the syrup product to ethanol, and using the ethanol in Step E to extract soluble-sugars flow the defatted cake.

2. The process of claim 1 in which the flaked soybeans are defatted by pressing.

3. The process of claim 2 in which the flaked soybeans are pressed at a temperature between about 80 and 110 C.

4. The process of claim 3 in which the defatted cake is cooled to a temperature of less than about 100 C before extraction of the soluble sugars.

5. The process of claim 4 in which the cooled, defatted cake is first contacted with miscella.

6. The process of claim 4 in which the cake containing less than about 5 wt percent soluble sugars is pressed to remove ethanol, exposed to flash evaporation of the remaining ethanol, dried, cooled and ground to a cream-colored powder.

* * * * *